Patented Aug. 14, 1951

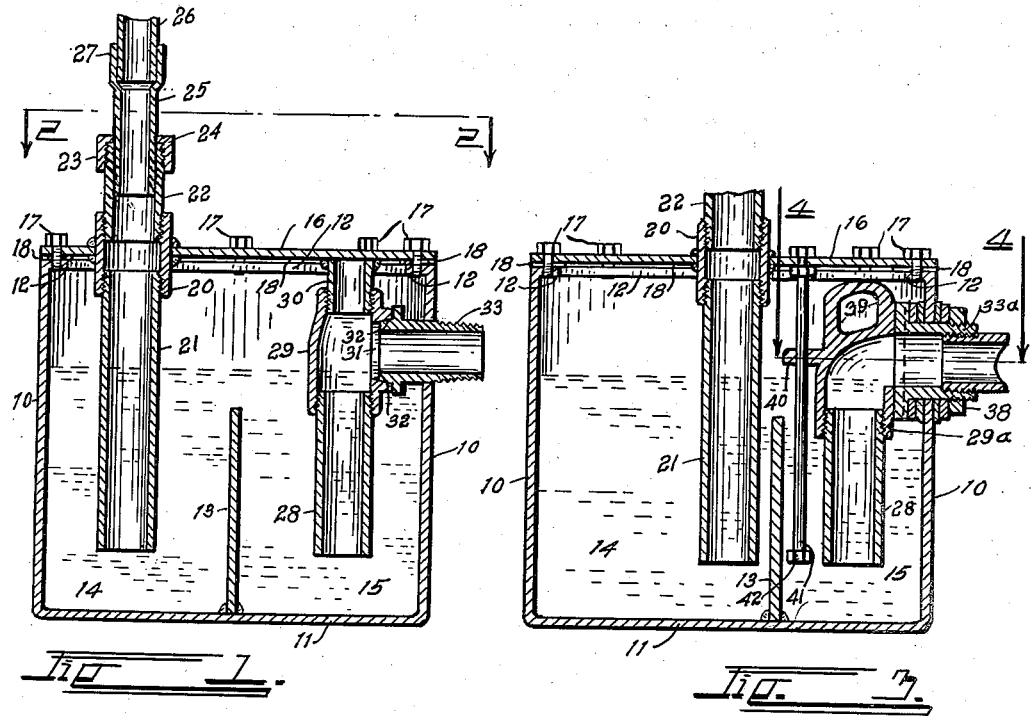

2,564,172

UNITED STATES PATENT OFFICE 2,564,172

GREASE TRAP

Alfred V. Raaberg and Jack W. Crays,
Pueblo, Colo.

Application February 5, 1949, Serial No. 74,734

6 Claims. (Cl. 182—9)

This invention relates to improvements in grease traps for sinks or other greasy water drains.

One of the objects of the invention is to provide a grease trap, all parts of which may be easily cleaned.

Another object is to provide a trap which may be more readily and economically installed.

Another object is to provide a trap in which the delivery and discharge pipes are affixed to a removable cover.

Another object is to provide a trap in which the waste drain pipe is readily accessible for cleaning when the cover is removed.

Another object is to provide a trap which may be installed with the same minimum amount of plumbing regardless of the position of the waste pipe relative to the sink drain pipe.

A further object is to provide a trap with a minimum number of parts which may be readily and economically fabricated.

Still further objects, advantages, and salient features will become more apparent from a consideration of the description to follow, the appended claims, and the accompanying drawing, in which:

Figure 1 is a vertical section of one form of trap, taken on line 1—1, Figure 2;

Figure 2 is a section taken on lone 2—2, Figure 1;

Figure 3 is a vertical section through an alternative form of trap;

Figure 4 is an enlarged section taken on line 4—4, Figure 3; and

Figure 5 is a side elevation taken in the direction of arrow 5, Figure 4.

Referring in detail to the drawing, and particularly to Figures 1 and 2, the trap casing is formed with a circular wall 10, a bottom wall 11, and a flange 12, these parts being secured together in any manner desired, such as by welding. An upwardly extending baffle 13 is secured to the bottom wall and extends across the casing to divide it into compartments 14 and 15.

The top of the casing is closed by a removable cover 16 which is secured to flange 12 by a plurality of screws 17 which threadedly engage the flange, a gasket 18 being interposed between the flange and cover. A coupling 20 is secured to the cover and carries a depending pipe 21 and an upwardly extending pipe nipple 22, these threadedly engaging the coupling with conventional tapered pipe threads. A pack nut 23 threadedly engages the upper end of the nipple and compresses a gasket 24. The nipple is connected to the sink (not shown) by a conventional thin wall tube 25 and a similar tube 26 which is affixed to the sink drain, these pipes being joined by a telescopic slip connection 27. It is to be understood that the particular plumbing between the coupling and sink is illustrative only and other types of plumbing connections may be used. The cover also carries another depending pipe 28, this pipe being secured to the cover by a T connection 29, having a nipple 30, the upper end of which is welded or otherwise secured to the cover. The nipple 30 serves only to support the T and if desired an elbow may be employed in lieu of the T, any suitable fastening means being used to secure the elbow to the cover.

The side outlet 31 of the T or elbow has a tapered bore 32 which engages a male taper on the end of a nipple 33 secured to the tank side wall.

In Figures 3 to 5 is shown an alternative construction, the principal difference being in the manner in which elbow 29a is connected to the drain pipe connection or fitting 33a. The elbow 29a and fitting 33a are formed with tapered mating male and female dovetails which draw the two members together when the elbow is moved downward. The fitting 33a is provided with an adapter washer 35, flat on one side and convex on the other, and a similar washer 36 having a concave surface. Between the respective washers and wall 10, gaskets 37 are interposed and a nut 38 secures the assembly to the wall. In event the wall is flat, these adapter washers may be eliminated or flat washers may be employed in their stead.

The elbow 29a has a handle 39 at the top and an apertured lug 40 projecting laterally thereof. A rod 41 having a head 42 at its lower end is secured to the cover by nuts or the like as shown and passes through the aperture in the lug. When the cover is lifted, the head 42 engages the lug and withdraws elbow 29a from the casing. The handle 39 is employed to align the dovetail during assembly, as will hereinafter be more fully described.

In the construction just described the coupling 20 is shown at the center of the casing, whereas in the construction shown in Figures 1 and 2, it is to one side of the center. It is contemplated to place coupling 20 wherever desired in the cover of either construction. That is, in Figure 1, the baffle may be disposed to the right of its present position and the coupling 20 placed in the center of the cover. Similarly, the coupling 20 in Figure 3 may be moved to the left of center, if desired. The manner of connecting the coupling 20 in Figure 3 to the sink is the same as described for the construction shown in Figures 1 and 2.

When installing either of the constructions, the trap is placed on a suitable support below the sink, which will usually be the floor, with coupling 20 axially aligned with the sink drain pipe 26, a suitable length of pipe 25 having been inserted into nipple 22. Pipe 25 is then lifted to telescope over the sink drain pipe 26. The pack nut 23 is then tightened, or alternatively, may be tightened after the remaining connection is made. The trap is then rotated to a position where outlet 33 or 33a is closest to the waste drain pipe (not shown) and suitably connected with a nipple and unison or other appropriate pipe fittings.

When it is desired to clean the trap shown in Figures 1 and 2, pipe 25 is disconnected from pipe 26 by lowering the former into nipple 22. Screws 17 are then removed and the cover moved laterally to disconnect elbow or T 29 from nipple 33. The cover, together with pipes 21 and 28 are then lifted from the casing and are cleaned. The trap is also cleaned and in event the waste pipe is clogged, a "snake" may be inserted through nipple 33. It is to be observed that no baffles or other obstructions are disposed in front of nipple 33, hence this opening is readily accessible for insertion of the "snake" or other cleaning instrumentality.

In the construction shown in Figures 3 to 5, the pipe 22 and cover 16 are disconnected in the same manner above described and the cover lifted. When head 42 strikes lug 40, rod 41 then picks up elbow 29a and lifts it from the casing. In again assembling this construction after being cleaned, the cover is placed over the trap and handle 39 is employed to guide elbow 29a into the dovetail connection 34 after which the cover is lowered onto the casing and secured thereto.

It is to be particularly observed that all parts of the trap of either construction disclosed are readily accessible for cleaning when the cover is removed because pipes 21 and 28 are removed with the cover. This invention, therefore, is to be distinguished from constructions wherein the cover is removable, but after having been removed, it is necessary to make further disconnections to render the inside of pipes analogous to 21, 28, accessible for cleaning. It is also to be distinguished from constructions wherein the waste pipe to the sewer is accessible but only after removing internal fittings in the trap or disconnecting the trap from the waste pipe. In this invention the connection to the waste pipe need not be disconnected since the waste pipe is always accessible from the inside of the trap, there being no baffles or other obstructions in front of it.

As previously described, the walls of the casing may be secured together by welding. Alternatively, the casing and cover may be constructed as castings. With the latter construction it is apparent that coupling 20 would be cast integral with the cover and could extend on both sides as shown or could extend from one side only. The flange 12 could extend inwardly as shown, or outwardly of the casing, or could be formed as a series of projecting lugs rather than a continuous flange. If such lugs extended outwardly it is apparent that matching projecting lugs on the cover could be provided. The fitting 33 or 33a and baffle 13 may also be cast integral with the casing, or if desired, the baffle may be made removable by providing vertical grooved bosses on opposite sides of the casing into which the vertical edges of the baffle may slide. In the construction of Figure 3 a chain or other flexible member may be substituted for rod 41, one end thereof being secured to the cover and the other end to lug 40, sufficient slack being provided in the chain so that the cover may move an appreciable distance from the casing before disengaging the fitting 33a. This construction has some advantage over the rod 41 in that the slack in the chain will permit movement of the cover laterally to render the inside of the casing somewhat more accessible in event it is necessary to strike the fitting 29a to either engage or disengage it with fitting 33a. It is also apparent that any suitable handle, handles, or other lifting means may be provided on the cover to facilitate lifting or manipulating it during assembly or disassembly.

Also, the shape of the casing has been described as round but it will now become apparent that it may be made square, rectangular, or other shape. Coupling 20 may be eliminated if desired and pipes 21 and nipple 22 formed as a single pipe welded to the cover and projecting therethrough. While two different connections below the elbow and its mating fitting have been disclosed, it will also become apparent once the invention is understood, that other connections may be provided whereby the pipes 21 and 28 are removed with the cover. The manner of connecting the trap to the sink may also be varied. Further modifications within the spirit of the invention will also become apparent and the precise details are to be considered as exemplary and the invention not limited thereto except as defined by the scope of the appended claims.

Having described the invention what is claimed as new is:

1. A grease trap comprising; a casing having an outlet conduit in its side wall, the casing being adapted to retain liquid below the level of the outlet conduit, a cover at the top of the casing, means detachably securing the cover to the casing, an inlet pipe rigidly secured to and depending from the cover having a discharge portion adapted to deliver liquid into the casing below said level, the inlet pipe and cover being removable as a unit from the casing, pipe coupling means for detachably connecting the upper end of the inlet pipe to a pipe extending to a liquid source to be drained, an outlet pipe within the casing having an inlet portion disposed below said level for receiving liquid to be discharged from the casing, a pipe coupling device detachably connecting an upper portion of the outlet pipe with said outlet conduit, and baffle means within the casing constructed and arranged to direct flow of liquid in a tortuous path from the discharge portion of the inlet pipe to the inlet portion of the outlet pipe.

2. A grease trap in accordance with claim 1 wherein said outlet pipe is rigidly connected to the cover and removable therewith.

3. A grease trap in accordance with claim 1 wherein said pipe coupling device and outlet conduit are constructed and arranged to telescopically engage.

4. A grease trap in accordance with claim 3 wherein said pipe coupling device includes tapered dovetail guides.

5. A grease trap in accordance with claim 3 wherein said outlet pipe is provided with a handle.

6. A grease trap in accordance with claim 3 including a lost motion device connecting the outlet pipe to the cover.

ALFRED V. RAABERG.
JACK W. CRAYS.

REFERENCES CITED

The following references are of record in the file of this patent:

UNITED STATES PATENTS

| Number | Name | Date |
|---|---|---|
| 1,053,452 | Stover | Feb. 18, 1913 |
| 2,003,139 | Dehn | May 28, 1935 |
| 2,057,203 | Payzer et al. | Oct. 13, 1936 |
| 2,472,322 | Weissman | June 7, 1949 |